US012647771B2

(12) United States Patent
Alnås et al.

(10) Patent No.: US 12,647,771 B2
(45) Date of Patent: Jun. 2, 2026

(54) METHOD FOR HANDLING OF TERMINAL CAPABILITIES IN A WIRELESS NETWORK

(71) Applicant: Sony Group Corporation, Tokyo (JP)

(72) Inventors: Svante Alnås, Lund (SE); Torgny Palenius, Barsebäck (SE)

(73) Assignee: Sony Group Corporation, Tokyo (JP)

( * ) Notice: Subject to any disclaimer, the term of this patent is extended or adjusted under 35 U.S.C. 154(b) by 343 days.

(21) Appl. No.: 17/613,046

(22) PCT Filed: May 18, 2020

(86) PCT No.: PCT/EP2020/063764
§ 371 (c)(1),
(2) Date: Nov. 20, 2021

(87) PCT Pub. No.: WO2020/244911
PCT Pub. Date: Dec. 10, 2020

(65) Prior Publication Data
US 2022/0256329 A1     Aug. 11, 2022

(30) Foreign Application Priority Data
Jun. 4, 2019     (SE) .................................... 1950659-1

(51) Int. Cl.
*H04W 8/20*          (2009.01)
*H04W 8/18*          (2009.01)
(Continued)

(52) U.S. Cl.
CPC ............. *H04W 8/183* (2013.01); *H04W 8/22* (2013.01); *H04W 8/26* (2013.01)

(58) Field of Classification Search
None
See application file for complete search history.

(56) References Cited

U.S. PATENT DOCUMENTS

2016/0301790 A1    10/2016    Kanamarlapudi
2019/0313239 A1*   10/2019    Horn ......................... H04L 5/14

FOREIGN PATENT DOCUMENTS

CA          2791855 A1      9/2011
CA          2791857 A1      9/2011
(Continued)

OTHER PUBLICATIONS

Oppo, "Procedure for capability ID assignment", SA WG2 Meeting #132 S2-1903216, Apr. 8-12, 2019, Xi'an, China.
(Continued)

*Primary Examiner* — Gary Lafontant
(74) *Attorney, Agent, or Firm* — Tucker Ellis LLP

(57) ABSTRACT

A method for use in a network node (110A), such as an AMF, of a wireless network (10), for handling capability information of a UE which is communicating with an access node (121) of the wireless network, the method comprising obtaining (612) a first capability ID (CapID1, CapIDM) identifying a first set of UE capabilities associated with said UE; transmitting (614), to a central database (116), a request message based on the first capability ID and filter information (FIL) associated with supported capabilities of the said access node (121), to obtain UE capabilities for the UE; receiving (616), from the central database, a filtered set of capabilities based on the first capability ID and the filter information (FIL); transmitting (618) the filtered set of capabilities to the access node.

15 Claims, 4 Drawing Sheets

(51) Int. Cl.
  *H04W 8/22*  (2009.01)
  *H04W 8/26*  (2009.01)

(56) References Cited

FOREIGN PATENT DOCUMENTS

| | | |
|---|---|---|
| CN | 102884821 A | 1/2013 |
| CN | 108028752 A | 5/2018 |
| EP | 3319351 A1 | 5/2018 |
| WO | 2017078580 A1 | 5/2017 |
| WO | WO-2018230983 A1 | 12/2018 |
| WO | WO-2019031540 A1 | 2/2019 |

OTHER PUBLICATIONS

Catt, "Signalling Procedures Containing UE Capability ID", 3GPP TSG-RAN WG2 Meeting #106 R2-1906450, May 13-17, 2019, Reno, USA.

Qualcomm Incorporated, "Provisioning of UE Capability ID", SA WG2 Meeting #132 S2-1903204, Apr. 8-12, 2019, Xi'an, P.R. China.

International Search Report from corresponding International Application No. PCT/EP2020/063764, Aug. 4, 2020, 5 pages.

Office Action and Search Report from corresponding Swedish Application No. 1950659-1, Jan. 9, 2020, 9 pages.

3rd Generation Partnership Project (3GPP), "Technical Specification Group Services and Systems Aspects, Study on optimisations of UE radio capability signalling (Release 16)," 3GPP TR 23.743, V2.0.0, Mar. 2019, 57 pages.

MediaTek Inc., "Summary of email discussion [104#34][NR/UE Cap SI] UE cap ID signalling options (MediaTek)," 3GPP TSG-RAN WG2 Meeting #105, R2-1900821, Feb. 25-Mar. 1, 2019, 39 pages.

Ericsson et al., "Capability ID based on early filter information," 3GPP TSG-RAN WG2 #106, R2-1907339, May 13-17, 2019, 6 pages.

Qualcomm Incorporated et al., "Adds UE Radio Capability ID in signalling procedures," 3GPP TSG-SA WG2 Meeting #133, S2-1906385, May 13-17, 2019, 66 pages.

Ericsson, "Aspects on filtered capability enquiries with SA2 Capability ID Solutions," 3GPP TSG-RAN WG2 #105, R2-1900646, Feb. 25-Mar. 1, 2019, 10 pages.

3rd Generation Partnership Project (3GPP), "Technical Specification Group Radio Access Network, Study on optimisations of UE radio capability signalling; NR/Evolved Universal Terrestrial Radio Access Network (E-UTRAN) aspects (Release 16)", 3GPP TR 37.873 V0.1.0, Mar. 2019, 18 pages.

Ericsson et al., "Alternative Capability ID based on early filter information," 3GPP SA WG2 Meeting #132, S2-1903179, Apr. 8-12, 2019, 5 pages.

* cited by examiner

UE 20      RAN 120      Node 110A      Node 115      Node 110B

711.
ConfMsg

71. CapID
change
trigger 723      722      721

725

712. CapID2

724      72

726

727

73. CapID
change

731. Change Ack 728      729

732. Change Ack

730

75. Record
CapID
change

733. Change Ack

METHOD FOR HANDLING OF TERMINAL CAPABILITIES IN A WIRELESS NETWORK

TECHNICAL FIELD

This disclosure relates to methods and devices for handling capabilities of a terminal in a wireless network. More specifically, solutions are provided for identification of terminal capabilities and for managing transmission of capabilities between various entities within the network.

BACKGROUND

In wireless communication systems, such as various generations provided through the 3rd Generation Partnership Project (3GPP), various generations of specifications have been provided for setting up common rules for setting up and operating both a wireless radio interface between a wireless terminal and a base station, and various levels of operation of the wireless network. In 3GPP documentation, a wireless terminal, or wireless communication device, is commonly referred to as a User Equipment (UE). The term UE will be used going forward in this disclosure, but it may be noted that the proposed solution may apply to other systems than 3GPP systems. A base station defines a cell and is operative to serve a surrounding area with radio access for UEs, by providing radio access to UEs within a cell. A base station is also referred to herein as an access node, and various terms are used in 3GPP for different types of systems or specification. An access network, or Radio Access Network (RAN), typically includes a plurality of access nodes, and is connected to a Core Network (CN) which inter alia provides access to other communication networks. In the so-called 3G specifications, also referred to as the Universal Mobile Telecommunications System (UMTS), the term NodeB is used to denote an access node, whereas in the so-called 4G specifications, also referred to as Long-Term Evolution (LTE), the term eNodeB (eNB) is used. A further developed set of specifications for radio communication are referred to as the 5G type radio communication system (5GS), including the New Radio (NR) technology, wherein the term gNB is used to denote an access node.

UEs can have many different capabilities, such as radio capabilities, e.g., associated with modem properties or supported functionality in the UE. In order to make various entities of the wireless network aware of the capabilities supported by a certain UE, the UE indicates its capabilities to the wireless network. This is typically accomplished when the UE registers with the wireless communication network. The capabilities can be indicated in different formats, e.g., in terms of parameters or indicators listed in one or more information elements of one or more messages.

In general, the UE may indicate multiple different capabilities, which may for example concern frequency bands of a wireless communications system, supported frequency band combinations, support of different modulation and demodulation formats, maximum data demodulation rate, 3GPP release version, or specific functions such as relaying or the support of device-to-device communication. In the existing technology, the UE capabilities are indicated in a rather static manner to the network. The capabilities may be indicated upon initial network registration and in some handover scenarios, in response to the network sending a UE capability enquiry. For initiating an update of the capability information from the UE side, the UE may need to re-register in the network.

With the increasing amount of UEs operating in the wireless networks, and the concurrently increasing number of supportable services, features, radio frequency bands etc., the data size of the UE capabilities continues to grow. Current 3GPP releases already have problems with the size of the capabilities. Studies approved within 3GPP to investigate ways of improvement have suggested allocating UE capabilities IDs for the set of UE capabilities. A UE capability ID may be manufacturer-specific, determined by the UE manufacturer, or network-specific for a certain PLMN (Public land mobile network) or a part thereof, determined e.g. by the operator of the network. Further information and definition of capabilities is specified in 3GPP specification 38.306, whereas the RRC signaling between the access network (RAN) and the UE is defined in 3GPP specification 38.331. Definitions associated with UE capability ID signaling within the Core Network can be found in 3GPP specification 23.502.

However, even with the introduction of a UE capability ID, the growing size of the UE capabilities still poses a problem for network operators. At some point, the UE capabilities as such need to be transmitted, at least within the network. This applies both to transmission between the core network and the access network, but also between nodes of those networks. Besides imposing a large amount of data transmission, this transmission may cause latency problems, which delay proper configuration of a UE to the network.

Accordingly, there is a need for techniques that allow for efficiently indicating supported capabilities of a UE or similar wireless communication device to the wireless communication network and in an efficient way communicate this internally within the 3GPP network, both within the access network and to/from the core network. Moreover, not all parts of an access network may support all features that a UE supports, meaning that an unnecessary amount of UE capability data may be transmitted.

SUMMARY

A general object is to provide improved solutions for handling UE capability information in a wireless communication system. In particular, an aspect of this object is to minimize the amount of signaling or data required for conveying capability information, within the wireless network and between the wireless network and the UE. Solutions targeting these problems are set out in the independent claims. Further advantageous embodiments are laid out in the dependent claims.

According to one aspect, a method is provided for use in a network node of a wireless network, for handling capability information of a UE, the method comprising obtaining capability information for the UE;

storing a first capability ID as an identification of a set of UE supported capabilities from said capability information;

detecting an ID change trigger indicating a second capability ID identifying the same set of UE capabilities;

changing identification of said set of UE capabilities from the first capability ID to the second capability ID.

The proposed method provides harmonization of capability IDs, with the effects of minimized network transmission of UE capability information and an improved associated latency situation.

According to another aspect, a method is provided for use in a network node of a wireless network, for handling capability information of a UE, which is communicating with an access node of the wireless network, the method comprising obtaining a first capability ID identifying a first set of UE capabilities associated with said UE;

transmitting, to a central database, a request message based on the first capability ID and filter information associated with supported capabilities of the said access node, to obtain UE capabilities for the UE;

receiving, from the central database, a filtered set of capabilities based on the first capability ID and the filter information;

transmitting the filtered set of capabilities to the access node.

The proposed method provides a more effective handling of UE capability information, resulting in minimized requirements for data storage and network transmission of UE capability information. This will also reduce the latency in the network when network nodes need to receive partial set of capabilities from UCMF to be able to manage the UE.

According to further aspects, network nodes and a UE are provided for operating under the provided methods.

BRIEF DESCRIPTION OF THE DRAWINGS

Various embodiments will be described with reference to the drawings, in which.

DETAILED DESCRIPTION OF EMBODIMENTS

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Figure 1:
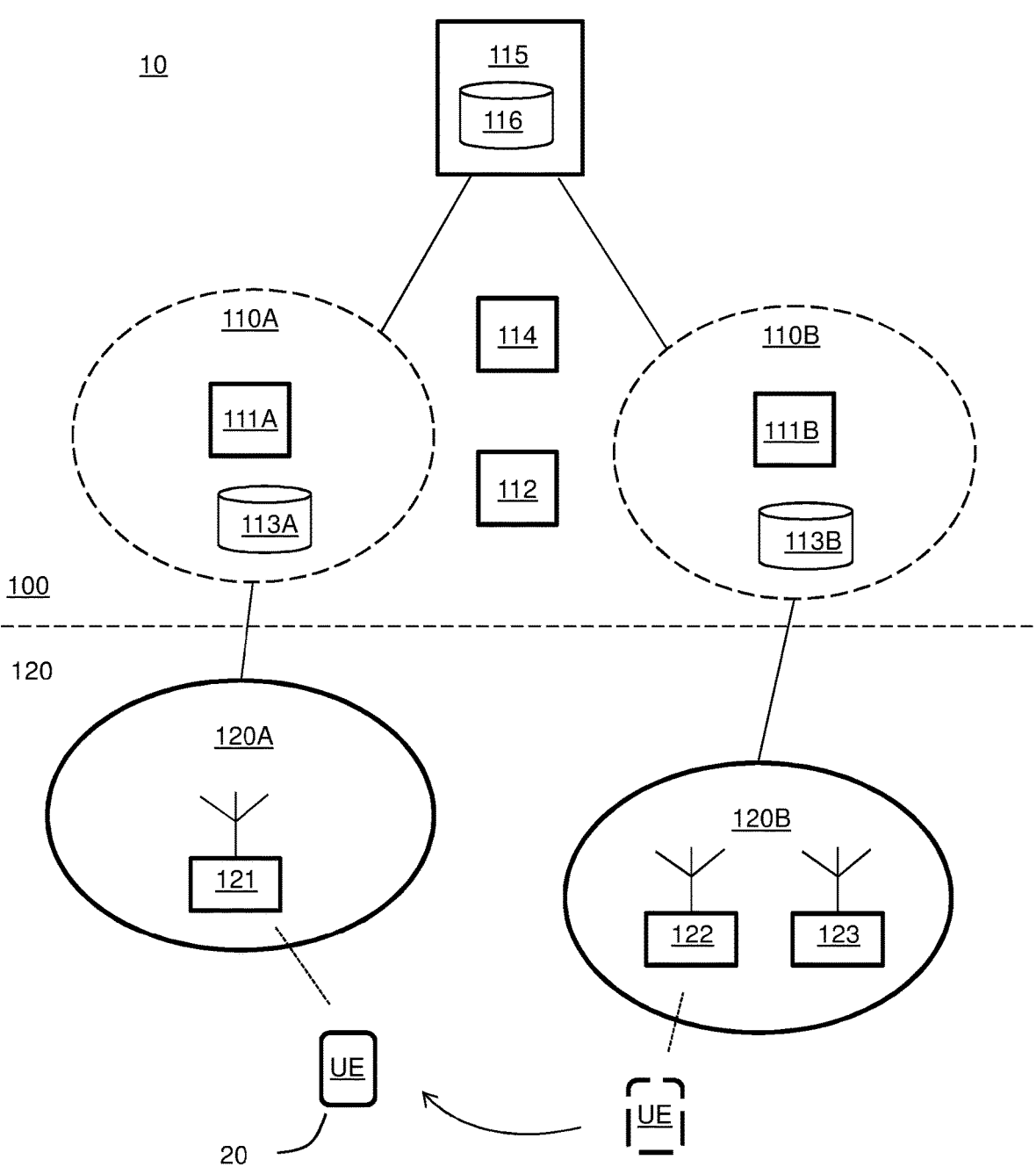
FIG. 1 schematically illustrates a network of a wireless communication system including networks nodes according to various embodiments.

FIG. 1 schematically illustrates a wireless network 10 of a wireless communication system. The wireless network comprises a core network 100 which provides access to other communication networks, such as the Internet, and an access network 120 for communication with UEs, of which one UE 20 is shown. The access network 120 may include a plurality of access nodes 121, 122, 123 configured to serve various cells. The access network 120 may e.g. be a Radio Access Network (RAN). The UE 20 is a wireless device configured to communicate wirelessly with access nodes of the access network 120, such as by radio. UEs may be stationary or mobile.

The CN 100 may include various core network nodes 110A, 110B, defined in accordance with a certain 3GPP release or in accordance with another set of wireless communication standards. Such CN entities may include at least one node 111A, 111B for handling mobility of UEs, such as an Access & Mobility management Function (AMF). Other CN entities may include a Session Management Function (SMF) 112. The CN may further include a User Plane Function UPF 114, and one or more gateways (not shown) such as a Serving Gateway and a PDN Gateway.

Each access node 121, 122, 123 may in various embodiments be referred to as a base station, serving one cell each. The access network 120 may comprise a number of access network groups 120A, 120B. Each such access network group 120A, 120B may be supported and served by one or more CN network node(s) 110A, 110B, at least for UE mobility management. Each access network group 120A, 120B may comprise a plurality of access nodes. For the sake of simplicity, only access node 121 is illustrated in access network group 120A and only access nodes 122 and 123 are illustrated in access network group 120B. In various embodiments, an access network group 120A is defined as a portion, of the entire access network 120, which is served by one AMF or one AMF set, which AMF set may include several AMFs. An AMF set is defined in 3GPP and contains a group of AMFs that may for example be able to replace each other without unnecessary signaling to the UE. An access network group may for example be a portion 120A of the entire access network 120, covering a certain area such as a rural or scarcely populated region of a country.

Each access node 121, 122, 123 has a configured interface to the core network 100 for Control plane and User plane, referred to as N2 and N3 interfaces in 5G. Corresponding interfaces S1-C and S1-U are provided in LTE. Access nodes may further be inter-connected by means of a logical inter-node interface. In 5G, this interface, or set of interfaces, is referred to as Xn interface, and has a similar purpose as the X2 interface defined for LTE.

For the purpose of managing UE capabilities in the network 10, a central or global CN node 115 may be included, comprising or being connected to a central or global database 116. The database 116 may be configured to store UE capabilities, also referred to as capability information herein, for the network 10. The database 116 may further store capability IDs associated with various combinations, parts, or subsets of such capability information. In various embodiments, the global database 116 stores data for whole PLMN.

A study regarding RACS ID (ID for Radio Access Capability Signaling) is described in TR 23.743, in which it is suggested to implement such IDs representing a set of capabilities. In the TR two sets of IDs that may identify a set of capabilities are proposed, i) a Manufacturer specific ID, managed by the UE manufacturer and stored in a common database that can be accessed from the 3GPP network, and ii) a PLMN specific ID, which defines the capability in the PLMN. The PLMN specific ID can be defined from a local point of view or it can be a global ID for the entire PLMN. The different sets of IDs may e.g. be separated by different initial digits in the number. RACS is as such further outlined and specified in 3GPP specification 23.501.

For a manufacturer specific solution, the UE capability ID may be assigned by the UE manufacturer in which case it is accompanied with the UE manufacturer information (e.g. TAC field in the PEI). In this case, the UE capability ID uniquely identifies a set of UE Radio capabilities for this manufacturer, and together with this UE manufacturer information uniquely identify this set of UE Radio capabilities in any PLMN.

A PLMN specific solution has been suggested to be used at least if a manufacturer assigned UE capability ID is not used by the UE, or the serving network 10, or it is not recognized by the serving network 10. In such a case, the serving core network 100 may allocate UE capability IDs for the UE corresponding to different sets of UE Radio capabilities the PLMN may receive at different times from the UE. In this case, the UE capability IDs the UE receives are applicable to the serving PLMN and uniquely identify the corresponding sets of UE Radio capabilities in this PLMN.

The database 116 may thus be configured to store PLMN specific capability IDs, assigned or determined by the network 10, such as the operator of the network 10. In addition, the database 116 may be configured to store manufacturer specific capability IDs that are assigned or determined by the manufacturer for a certain range, type or model of a UE.

In the embodiment illustrated in FIG. 1, the network 10 further includes at least one local database 113A, 113B per each network node 110A, 110B configured to handle UE mobility in the network. In various embodiments, the local database 113A may be part of the AMF 111A or AMF set or connected to one AMF 111A or AMF set, and another local database 113B may be connected to another AMF 111A or AMF set. Each local database 113A, 113B may further be configured to store PLMN specific capability IDs, assigned or determined by the network 10. In addition, the database 116 may be configured to store manufacturer specific capability IDs.

Figure 2:
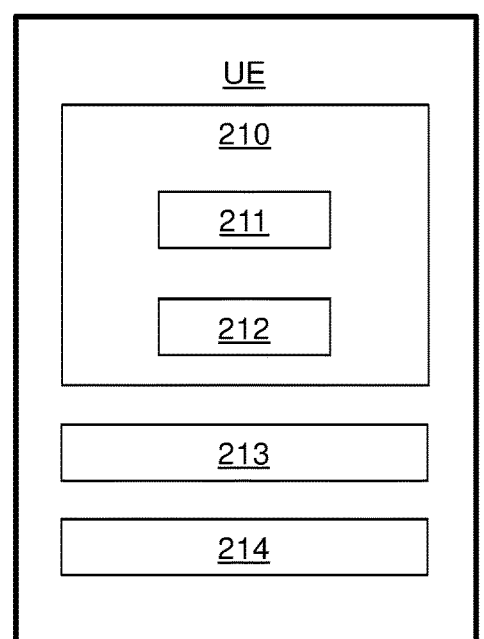
FIG. 2 schematically illustrates elements included in a UE configured in accordance with various embodiments.

FIG. 2 schematically illustrates a UE, such as UE 20 of FIG. 1. The UE may be configured for communication with the access network 120, and comprise a transceiver 213, such as a radio receiver and transmitter for communicating with the access network 120 through at least an air interface. The UE further comprises logic 210. The logic 210 may comprise for example a controller or microprocessor 211. The logic may also comprise or be connected to a data storage device 212 configured to include a computer readable storage medium. The data storage device 212 may include a memory and may be, for example, one or more of a buffer, a flash memory, a hard drive, a removable media, a volatile memory, a non-volatile memory, a random access memory (RAM), or other suitable device. In a typical arrangement, the data storage device 212 includes a non-volatile memory for long term data storage and a volatile memory that functions as system memory for the controller 211. The data storage device 212 may exchange data with the controller 211, e.g. a processor, of the logic 210 over a data bus. The data storage device 212 is considered as a non-transitory computer readable medium. One or more processors of the controller 211 of logic 210 may execute instructions stored in the data storage device 212 or a separate memory in order to carry out operation of the UE, as outlined herein. The UE may further comprise a data memory 214 for storing UE capability information and associated data, such as a capability ID. The data memory 214 may be or form part of the data storage device 212, or be a separate entity, but is specifically indicated in the drawing to identify the intended difference between storing code associated with a computer program or operating system in data storage 212 used for controlling and operating the UE, from capability data which can be accessed and sent to other nodes of the network 10. It may be noted that the UE clearly may include other features and functions than those identified, such as e.g. one or more antennas, a user interface, a power source and so on, but these components are not shown in FIG. 2 for clarity reasons.

Figures 3, 4:
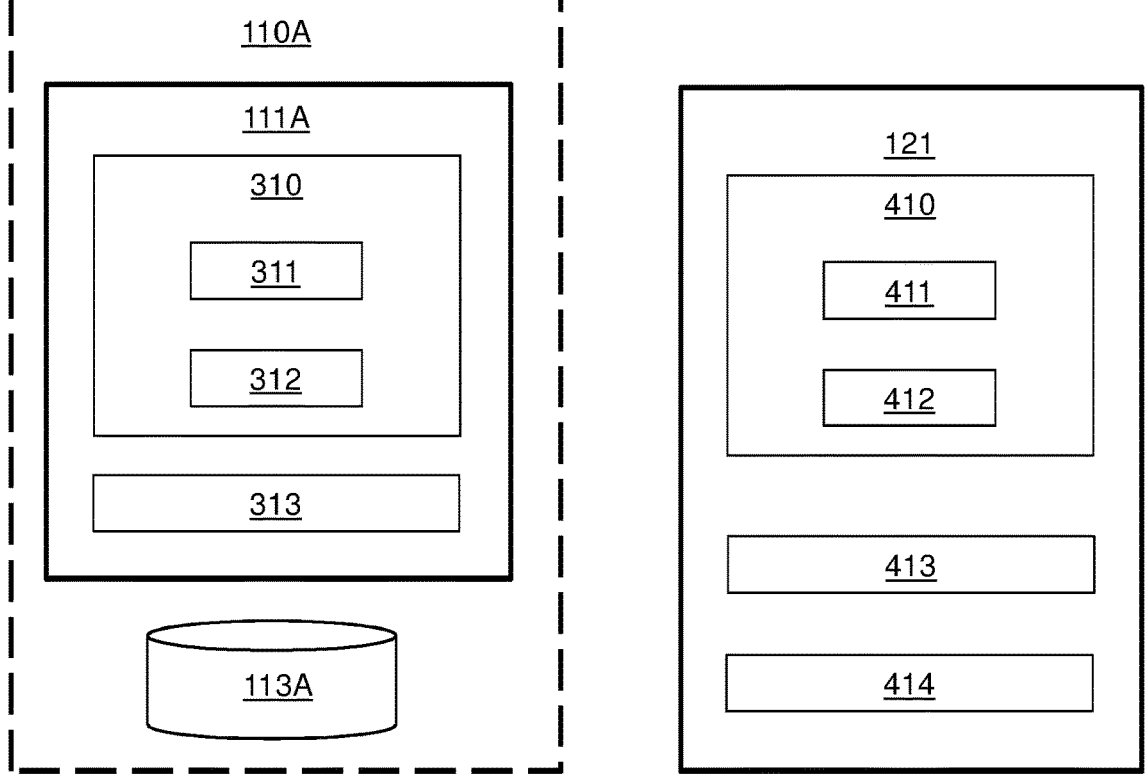
FIG. 3 schematically illustrates elements included in a network node of a core network configured in accordance with various embodiments.
FIG. 4 schematically illustrate elements included in an access nodes configured for operation with a UE and a core network in various embodiments.

FIG. 3 schematically illustrates a network node 110A of the core network 10. The network node 110A is or comprises a function for handling UE mobility in the network 10, and specifically within a supported access node group 120A. The core network node 110A may thus operate as control function 111A realizing an AMF or for controlling an AMF set. The control function 111A comprises CN node logic 310. The CN node logic 310 may comprise for example a controller or microprocessor 311. The logic 310 may also comprise or be connected to a data storage device 312 configured to include a computer readable storage medium. The data storage device 312 may include a memory and may be, for example, one or more of a buffer, a flash memory, a hard drive, a removable media, a volatile memory, a non-volatile memory, a random access memory (RAM), or other suitable device. In a typical arrangement, the data storage device 312 includes a non-volatile memory for long term data storage and a volatile memory that functions as system memory for the control unit. The data storage device 312 may exchange data with a processor 311 of the logic 310 over a data bus. The data storage device 312 is considered as a non-transitory computer readable medium. One or more processors 311 of the logic 310 may execute instructions stored in the data storage device or a separate memory in order to carry out operation of the CN node 110A, as outlined herein. The CN node 110A may comprise more components, for example a power supply, but these components are not shown in FIG. 3 for clarity reasons. The CN node 110A may further comprise one or more transceivers or interfaces 313 for communication with other entities, including other nodes 110B realizing AMFs, a global database 116 of a central core network node 115, and with access nodes 121 of the supported access node group 120A. The network node 110A may further comprise or be connected to a local database 113A for storing UE capability information and associated data, such as capability IDs, preferably for a plurality of UEs. The database 113A may physically be stored in a separate memory unit, connected to the control function 111A handling UE mobility. In other embodiments, the database 113A is realized in a common entity 110A as the control function 111A handling UE mobility, such as one AMF, or a control function for one AMF set. For the sake of illustration, the drawing shows that the network node 110A includes both the entity 111A and the database 113A.

FIG. 4 schematically illustrates an access node 121. The access node 121 comprises access node logic 410. The access node logic 410 may for example comprise a controller or microprocessor 411. The logic 410 may also comprise or be connected to a data storage device 412 configured to include a computer readable storage medium. The data storage device 412 may include a memory and may be, for example, one or more of a buffer, a flash memory, a hard drive, a removable media, a volatile memory, a non-volatile memory, a random access memory (RAM), or other suitable device. In a typical arrangement, the data storage device 412 includes a non-volatile memory for long term data storage and a volatile memory that functions as system memory for the controller 411. The data storage device 412 may exchange data with a processor 411 of the logic 410 over a data bus. The data storage device 412 is considered as a non-transitory computer readable medium. One or more processors 411 of the logic 410 may execute instructions stored in the data storage device or a separate memory in order to carry out operation of the access node 121 as outlined herein. The access node 121 may comprise more components, for example a power supply, but these components are not shown in FIG. 4 for clarity reasons. The access node 121 may further comprise one or more transceivers 413 for communication with other entities. For example, the transceiver 413 may comprise a radio transceiver connected to an antenna arrangement (not shown), for communication over an air interface with the UE 20. Moreover, the transceiver 413 may define one or more interfaces to the core network 100. The access node 121 may further comprise a data memory 414 for storing UE capability information and associated data, preferably for a plurality of UEs. The data memory 414 may form part of the data storage device 412 or be a separate entity.

Figures 5A, 5B:
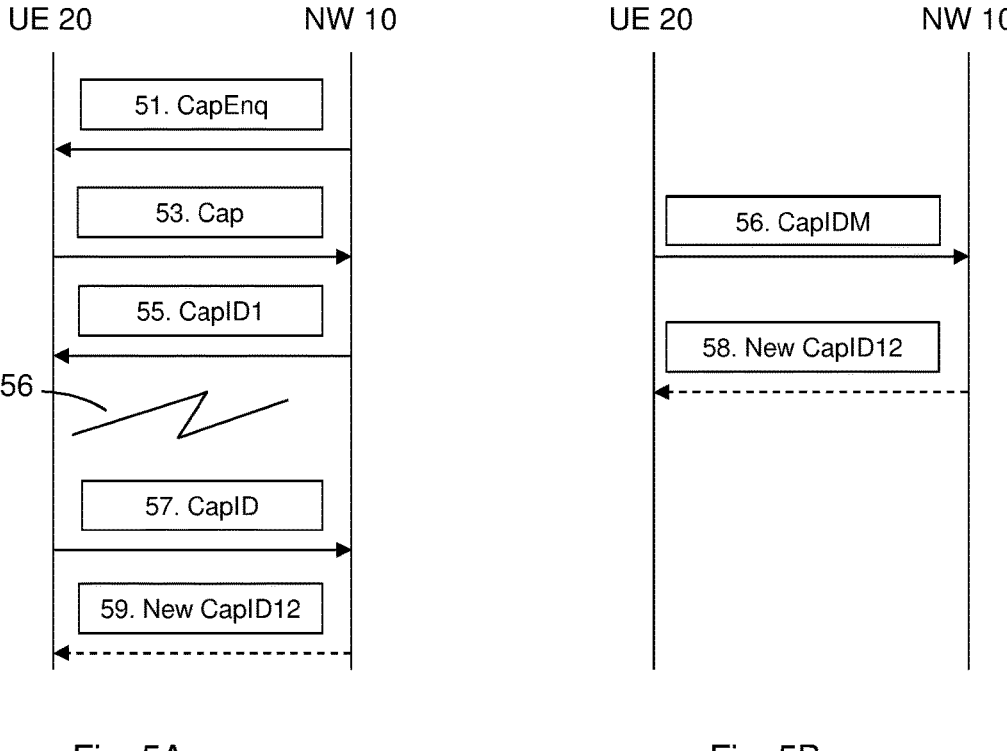
FIG. 5A shows a signal diagram for assigning and using a capability ID to a UE, and potentially changing the capability ID, included in various embodiments.
FIG. 5B shows a signal diagram for using a manufacturer assigned capability ID, and potentially changing the capability ID, while avoiding transmission of capability information over the air, according to various embodiments.

FIG. 5A schematically illustrates a process of configuration signaling that may be included in or precede various of the specific solutions for handling UE capability information as outlined herein. The drawing illustrates a UE 20 in communication with the wireless network 10. As will be understood by the skilled reader, communication with the network 10 is executed with an access node, such as one of access nodes 121, 122, 123.

When the UE registers to the network 10, the network 10 may transmit an enquiry message 51 to obtain UE capability information from the UE. The UE will respond in the uplink with a message 53 containing its UE capabilities, herein also referred to as capability information. The network may subsequently transmit a message 55 to the UE, containing a capability ID, CapID1, associated with the received capability information. In such an embodiment, the capability ID is PLMN specific, and relevant for the access network 120 as a whole, or for an access network group 120A of that access network 120. In other words, CapID1 is assigned by the network 10. CapID1 may be an identity that reflects the full UE capabilities, or a filtered set, relevant for the network 10. In the latter case, even if the UE were to report amended UE capabilities at a later stage, where those amendments relate to settings or capabilities that are not supported or used in the network 10, or parts of the network 10, the same PLMN specific CapID1 may still be employed.

The capability information may be stored in memory 214 of the UE. Transmission of the capability information may e.g. be accomplished by the UE transmitting a bitmap to indicate its UE capabilities to the network 10. The receiving access network 120 may store the capability information and may convey that data to the CN for storage, locally in a local database 113A and/or centrally in a global database 116. Transmission may be accomplished upon initial registration of the UE with the access network 120. However, in some scenarios the bitmap could also be transmitted at a later point of time. For example, the UE could transmit the bitmap while maintaining a connection to the access network 120, e.g., for indicating an update of its capabilities. The bitmap may include a plurality of bits from which subsets of one or more bits indicate whether or not, and optionally also in which way, a certain capability is supported by the UE. For example, a single bit of "1" could indicate that the capability is supported. A subset of multiple bits could indicate one of multiple options of supporting a certain capability, a level of support, e.g. distinguishing between no, basic, and full support, and/or one or more parameters related to the capability, e.g. a maximum supported bitrate when using the capability. The mapping of capabilities to bit positions in the bitmap may be preconfigured in the UE and the access node 121, 122. Such pre-configuration may be based on a telecommunication standard and may be based on factory settings or on operator defined settings. Accordingly, the support of a certain capability may be indicated in a binary manner (e.g., by a single bit indicating either "supported" or "unsupported"), but also be indicated by multiple bits, e.g., to indicate a level of support, a selected option, or one or more parameters related to the capability.

Referring again to FIG. 5A for a specific embodiment realized according to 3GPP terminology, a UE capability report is sent over the radio interface from the UE to the access node of the serving cell, such as access node 122, when the UE registers to the network 120. The network 120 requests the UE to send the relevant capabilities in the message "UE Capability Enquiry" 51. The UE responds with the message "UE Capability Information" 53. The UE capability Enquiry may typically contain the filters which the uplink UE capability information is based on. The UE capability information can be sent between the access nodes 121, 122, 123 every time the UE makes a handover to another RAN node. When a UE travels between cells in idle mode, UE context and UE capabilities may be transferred between access nodes via the CN 100. Thereby there is no need for the UE to send its UE capabilities every time. When the network supports RACS then, instead of sending the UE capability information between the access nodes 121, 122, 123 or via the CN 100, the Capability ID is used instead in the UE Context. When for example an access node receives a capability ID that is unknown then it may access a UE radio Capability Management Function (UCMF), which may form part of or make use of the global database 116, to be able to retrieve the actual UE radio capability.

With reference to FIG. 5A, the UE may re-register to the network 10 at a later stage, e.g. upon starting up after being powered off 56, or re-entering the network 10. New configuration signaling will then take place. This may be carried out with a completely different access node, or even a different access network group. With reference, to FIG. 1, the UE may first have registered with the network 10 through the access node 122, and later re-register by communication with the access node 121. With reference to FIG. 5A, re-registering may include the UE transmitting a message 57 in the uplink with, containing the capability ID CapID1 it has previously received. This way, the capability information does not have to be transmitted over the air again.

FIG. 5B may also be referred to for describing a process of configuration signaling that may be included in or precede various of the specific solutions for handling UE capability information as outlined herein, wherein a manufacturer specific capability ID CapIDM is employed. When the UE registers to the network 10, the UE may transmit a message 56 in the uplink, containing a pre-stored manufacturer specific CapIDM, associated with the capabilities of the UE. In such an embodiment, the capability ID is relevant for any access network, and the associated UE capabilities may be retrieved from a database held by the manufacturer, or from a network database in which a mapping between the manufacturer specific CapIDM and associated UE capabilities have been mirrored. Further reference to FIG. 5B will be made further below.

Solutions are proposed herein for making a change of a capability ID from a first ID to a second ID, where both capability IDs are derived from the same sets of UE capabilities, meaning that they identify a common set of UE capabilities supported by the access network 120, or part 120A thereof. Moreover, this may be accomplished without any change of state of the UE, just a switch of the used capability ID. Various embodiments further relate to providing filtered UE capabilities to various nodes, specifically to the access nodes, based on capability IDs but containing only a required subset of the UE capabilities.

There may e.g. be a need to change the capability ID even when the capabilities are the same in the following situations:

1) The new ID corresponds to a subset of UE capabilities which is the subset that is only relevant within the network 10 to optimize for latency and bandwidth when the actual capabilities are transferred.

2) Mobility between AMFs 111A and 111B which have their separate local lists of PLMN wide capabilities 3) When the network operator synchronizes local lists of PLMN specific capability IDs to a global list there may be a benefit to merge the PLMN-assigned IDs from different lists and therefore the IDs may be updated.

4) A UE registers with a Manufacturer specific capability ID which the network acknowledges, but the operator wants to make use of an assigned PLMN specific capability ID.

In some embodiments, solutions are provided for switching between locally defined PLMN specific and globally defined PLMN specific UE capability IDs. In other embodiments, this relates to switching between manufacturer specific and PLMN specific UE capability IDs. The rational to do so is that an operator may want to keep its own global set of capabilities with the appropriate filtering given the network 10 settings. On the other hand, when a UE is completely new and unknown to the network 10, the network 10 it may rely on the manufacturer defined capability ID, which is moved into or translated to a PLMN specific UE capability ID at some point. Another case is that when a UE is entering the network 10, in which the UE is unknown, a locally defined PLMN specific capability ID may be created which later is merged into a globally defined PLMN specific capability ID database, and thereby the ID is changed. For Manufacturer assigned capability IDs the corresponding UE capabilities always contain the full set of UE capabilities, but in internal interfaces the full set of capabilities adds extra latency and bandwidth so the operator may want to replace it with an assigned PLMN specific ID that corresponds to an filtered subset valid for that operator or access nodes 121, 122 and 123.

Figures 6A, 6B:
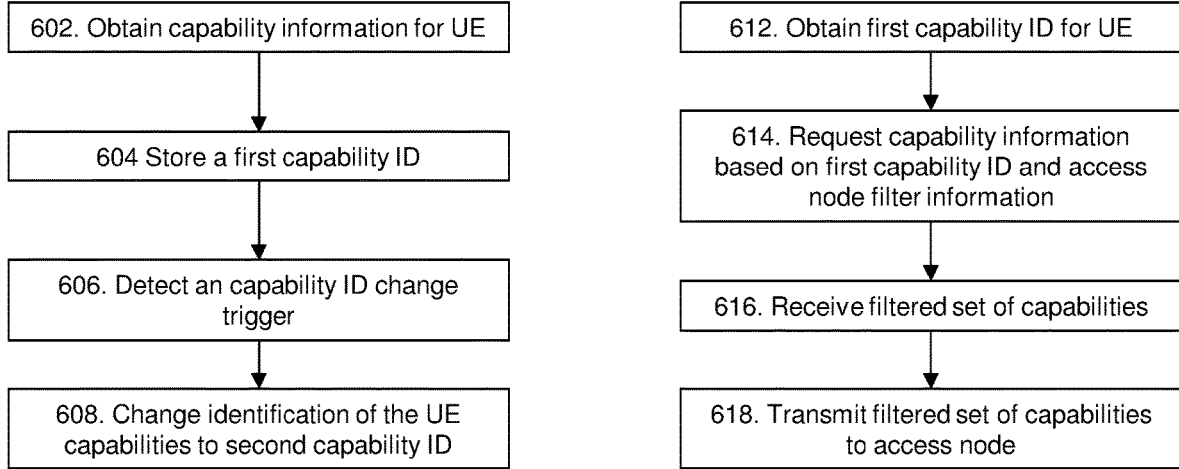
FIGS. 6A and 6B shows flow charts including several method steps carried out a network node according to various embodiments.

FIG. 6A broadly illustrates various steps of a method for use in a network node 110A, such as a core network node of a wireless network 10, for handling capability information of a UE. This method will now be described, with various associated embodiments being outlined. The method comprises several step, including the following.

602. Obtaining capability information for the UE.

The capability information may be obtained from the UE, via the access network 120. In other embodiments, the capability information may be received from another network node 110B, 115. The capability information may be the full set of UE capabilities for the UE, or a filtered set associated with what the network 10, in particular the access network 120, supports. The capability information for the UE may be locally stored in the database 113A.

604. Storing a first capability ID, CapID1, as an identification of a set of UE supported capabilities, Cap, from said capability information.

The UE supported capabilities CAP may be the full set of UE capabilities for the UE, or a filtered set associated with what the network 10, in particular the access network 120, supports. CAP may thus be a subset of the complete UE capabilities for the UE. Storing may be made in the local database 113A, included in or connected to the network node 110A, and mapped to the obtained capability information. In some embodiments, CapID1 may have been received from another network node 110B, 115.

With reference to FIG. 5A, the CapID1 which has been assigned to the UE may be communicated to the UE, such that the UE does not have to transmit its entire set of capability information the next time a configuration stage of registering to the network takes place, as illustrated in the lower part of FIG. 5A. If such re-registration is made, CapID1 may be received from the UE, such as in a message 57.

If no such capability ID has been obtained, the network node 110A may assign the capability ID CapID1. Alternatively, CapID1 may be assigned as a local variant of an already obtained identity, from the UE or another network node 110B, 115. The local variant may comprise the previously obtained identity, modified to indicate its association with the network node 110A, such as a specific AMF 111A or AMF set, or the access node 121 or the access network group 120A supported by that network node 110A.

606. Detecting an ID change trigger indicating a second capability ID CapID2, identifying the same set CAP of UE capabilities. For example, all locally assigned Cap IDs CapID1 could be assigned a global capability ID in the background by communication through the core network with the global database 116. As soon as the UE re-registers with a locally assigned Capability ID, this will be used as a trigger to change to the corresponding centralized Capability ID obtained from 116.

The trigger thus may be caused by a configuration of the identity of CAP made in the central node 115 operating a global database 116 for capability IDs. One scenario may be that CapID1 has been assigned by the AMF 111A, or has been received from a different network node 110B or an access node 121 upon handover or cell reselection of the UE. At some point, the network node 110A reports CapID1, together with the associated set CAP of UE supported capabilities, to the central node 115 operating the global database 116 of UE capabilities and capability IDs. In the central node 115, it may be determined that there already exists a globally assigned capability ID CapID2 for the set CAP of UE capabilities. Alternatively, the central node 115 may subsequently assign the global capability ID CapID2 for the set CAP of UE capabilities. In this context, the same set may mean a set of capabilities which includes the set of UE supported capabilities which are also supported by the network 10, or by a part of the network 10, such as the access network group 120A. CapID2 may thus identify further capabilities that are not supported in the access network group 120A operated by the network node 110A. In various embodiments, CapID2 may identify UE capabilities applicable to the entire access network 120, for a certain UE configuration to which the UE is determined to belong based on its UE capabilities. Once a global definition of a UE capability ID is defined, and conveyed to the local databases 113A, 113B, transmission of the capabilities CAP is no longer necessary in the network 10, which will reduce both data traffic and latency.

Detecting an ID change trigger may thus include receiving an ID configuration message, e.g. from the central network node 115 operating the global database 116, indicating an alternate identification of the set of UE capabilities, including the second capability ID CapID2. In other embodiments, the ID configuration message may be received from a further network node 110B, supporting a further access network group 120B of the network 10. This may e.g. be the case of a handover from an access node 122 connected to a different access network group, handled by another network node 110B, in which the globally assigned CapID2 has already been obtained. CapID2 may then be received in the network node 100A as part of the UE context for the UE.

608. Changing identification of said set of UE capabilities from the first capability ID to the second capability ID.

This may be accomplished by changing a mapping between stored UE supported capabilities CAP in the local database 113A and the associated identification, from CapID1 to CapID2. Alternatively, this may include adding a mapping between stored UE supported capabilities CAP in the local database 113A to CapID2 in addition to CapID1.

Related to the proposed method, the network node 110A may be configured to handle capability information of the UE, wherein the network node comprises logic 310 configured to control the network node to:
obtain 602 capability information for the UE;
store 604 a first capability ID CapID1 as an identification of a set of UE capabilities of said capability information;
detect 606 an ID change trigger indicating a second capability ID CapID2 identifying set of UE capabilities;
change 608 identification of said set of UE capabilities from the first capability ID to the second capability ID.

By means of the proposed method and network node 110A configuration, latency caused by signaling in the CN 100 may be minimized when a UE registers, re-registers, or sends updated UE capabilities to the network 10. Such problems may be caused by the transmission of large amounts of UE capability information from the network node 110A, such as the AMF 111A, to the global database 116, for obtaining a capability ID. Another disadvantageous scenario that is avoided is that the operator otherwise may have to arrange for analysis of which capabilities that already exist in the network 10 and which ones are possible to combine etc., and all this may add unnecessary latency that should be avoided during UEs registration or re-registration.

Rather, the network node 110A may obtain, e.g. assign, a first ID CapID1 and inform the UE during the attach procedure, in a manner as presented in FIG. 5A. The network node 110A may then subsequently obtain the globally assigned CapID2, and change the mapping in the network node 110A, such as in the local database 113A. This way, communication time with the UE is not affected at the configuration stage when the UE reports its UE capabilities.

In certain situations, a large number of UEs, e.g. of a certain fabrication, may have launched or may subsequently receive software updates which changes the UE capabilities. In prior solutions, this would entail the transmission of the complete set of UE capabilities for each UE through the CN 100 for registration and obtainment of the associated capability ID in the central node 115 operating the global PLMN specific database 116. With the proposed method, a fist capability ID CapID1 may be assigned in signaling with the network node 110A, and the network node 110A may then obtain a globally assigned capability ID CapID2 from central database 116, and map that to the set of UE capabilities for the UE in the local database 113A. For any further UE registering with the network 10, reporting the same complete set of UE capabilities, there is no need to carry out communication through the CN 100 with the global database at the configuration stage as shown in FIG. 5A. This minimizes both latency in the system, and the amount of required traffic in the CN 100.

With reference to the lower part of FIG. 5A, the method just described in association with FIG. 6A may in some embodiments involve transmitting a message 59 containing the new capability ID CapID2 to the UE, which previously has received the first capability ID CapID1. This way, the globally assigned PLMN specific capability ID may be updated and shared to the UE for future use. Note that the lower part of FIG. 5A indicates that the new capability ID CapID2 is transmitted in conjunction with the network 10 receiving the present capability ID CapID1 from the UE, e.g. at re-registration. It should be noted, however, that the new capability ID CapID2 may be conveyed from the network 10 to the UE at any other time or context.

One aspect of the proposed solutions will now be described with reference to FIG. 6B. In various embodiments, a capability ID may be applied which includes an identity of a certain network entity. This may be employed for obtaining appropriate UE capabilities, and also for minimizing CN traffic.

A method may therefore be employed for use in the network node 110A of the wireless network 10, for handling capability information of the UE which is communicating with access node 121 of the network. This method comprises 612. Obtaining a first capability ID CapID1 or CapIDM identifying a first set of UE capabilities associated with the UE.

614. Transmitting, to the central database 116 or a network node 115 operating the central database 116, a request message based on the first capability ID CapID1 or CapIDM and filter information FIL associated with supported capabilities of said access node 121, to obtain UE capabilities for the UE.

616. Receiving, from the central database 115, a filtered set of capabilities based on the first capability ID CapID1 or CapIDM and the filter information FIL.

618. Transmitting the filtered set of capabilities to the access node 121.

By means of these steps, only the parts of the entire set of UE supported capabilities that are needed, i.e. supported, in the access node 121 or the access network group 120A with which the UE registers or which holds the UE Context, or an anchor RAN Node, need to be obtained. These parts may be defined as a filtered subset of the UE capabilities that is sufficient for all access nodes 120A in that group or region 120A.

The filter information FIL may be, or may have already been, obtained by the network node 110A from the access network 120, such as specifically by and associated with access node 121 or with the access network group 120A it belongs to. It may be noted that a UE may support further features than the access node 121 or group 120A does. However, such further features are of no use to the network node 110A for configuring communication between the UE and the access node 121 or access network group 120A, and will therefore be filtered out by means of the filter information FIL. Indeed, the same filter may be employed by the access node 121 at registration, as in the upper part of FIG. 5A, in the enquiry message 51. In various embodiments, the filter information FIL may be obtained in the network node 110A, such as the AMF, together with a capability ID CadID1 or CapIDM obtained from the UE, in UE Context.

In the solution described with reference to FIG. 6B, obtaining 612 involves receiving the capability ID from the UE as in the process of the lower part of FIG. 5A, or the process of FIG. 5B, or from a further core network node 110B handling a different access network group 120B than the network node 110A. The capability ID may be PLMN specific CapID1, assigned by the network 10, or manufacturer specific CapIDM.

In one embodiment, the filter information may include a list of UE capability items supported by the access node 121. In variants of this embodiment, the filter information includes an indicator identifying the access node 121 or the access network group 120A comprising said access node 121. The indicator may thus be specific to the access node 121, the access network group 120A, or the network node 110A, or the AMF 111A or AMF set supporting the access network group 110A to which the access node 121 belongs. In some embodiments a modification of the capability ID is made to include or identify the filter information FIL, such as by adding said indicator to CapDI1. The request message may thus contain the modified first capability ID so as to identify the filter information FIL. The filter information FIL could for example be what type of access the access node is supporting, for example 3G, 4G or 5G. This may also be similar to the already existing filter information that is used from the access node to the UE in the Enquiry message, but instead of to the UE it could be used to the central database 115. Another example of filter information is an identity of the access node so the central database 115 is configured with what capability subset each access node should have.

By receiving 616 a filtered set of capabilities, the amount of capability data to transmit through the CN 100 may be decreased. In various embodiments, dependent on what support for UE communication the access node 121 and/or its access node group 120A offers, only a portion of the entire capability information associated with a PLMN assigned capability ID CapID1 in the global database 115 is received in the network node 110A. Still, the Access node 121 with which the UE communicates will be supplied with all the required UE capabilities that are relevant for both the UE and the access node 121.

One variant of the method outlined with reference to FIG. 6B may be employed in a scenario where the UE supports a manufacturer specific, and assigned, capability ID CapIDM. Moreover, the network 10 may support use of such manufacturer specific IDs and may thus be connected to a database which holds manufacturer specific UE capabilities and associated manufacturer specific capability IDs. Nevertheless, the operator of the network 10 may prefer to only signal a subset of these UE capabilities internally in the network 10, i.e. the PLMN, since the PLMN may not support all features the UE is supporting. In such a scenario, the PLMN may use a PLMN assigned specific capability ID CapID2 and obtain a UE capability set that is a subset of the full manufacturer specific UE capability set for that UE. Alternatively, the PLMN may rely on the obtained manufacturer assigned Capability ID CapIDM and use a filter in all request to the central database when retrieving corresponding subset of capabilities In such embodiments, the obtained first capability ID is thus a UE manufacturer specific capability ID CapIDM. The method of this embodiment may further comprise optionally assigning a second, network specific, capability ID CapID2 based on the UE manufacturer specific capability ID CapIDM and the filter information FIL. Where a second capability ID CapID2 is used, this may optionally also be transmitted in a message 58 to the UE, for future use. The second capability ID CapID12 may thus identify a subset of the UE manufacturer specific capabilities. The step 614 may include transmitting a message including the manufacturer specific capability ID CapIDM together with filter information FIL which identifies a subset of the UE manufacturer specific capabilities. The filter information FIL may include a list of UE capability items supported by the entire PLMN 10.

As a result, the UE capability set is never signaled from the UE, even though a PLMN specific capability ID is used. Moreover, the amount of data for the UE capabilities transmitted in the CN 100 may be limited since only the required data is fetched to the network node 100A. The PLMN specific capability ID CapID12, where employed, may subsequently be used within the network 10, e.g. at UE handover.

In the embodiments described with reference to FIGS. 6A and 6B, the network node 100A may comprise a core network node 111A comprising a network management function 111A and may be connected to local database 113A.

The network management function 111A may comprise an Access and Mobility Management Function, AMF, and may form part of an AMF set.

Figures 7, 8:
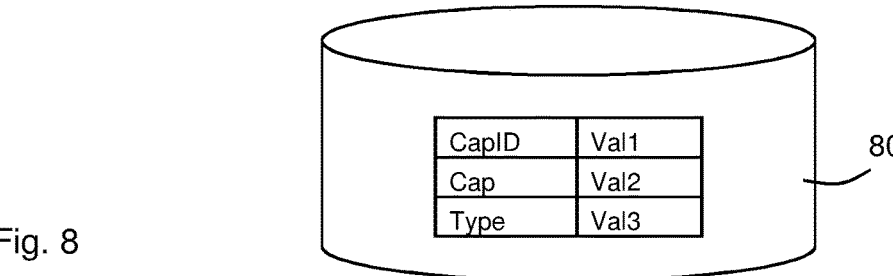
FIG. 7 shows a signal diagram for managing capability IDs, including transmission between various entities of a wireless network according to various embodiments.
FIG. 8 schematically illustrates a database for storing UE capabilities and capability IDs according to various embodiments.

FIG. 7 schematically illustrates a signaling diagram of a wireless communication system involving the network 10 and the UE. The drawing shows, for the network 10: the access network 120; the network node 110A, e.g. including a node 111A implementing AMF for a first access network group 120A; a further network node 110B, e.g. including a node 111B implementing AMF for a further access network group 120B; and a central node 115 connected to or including the global database 116.

The illustrated signaling diagram is based on the solutions set out herein, for making it possible for the network 10 to perform a simple update of the capability ID for a UE, without changing the actual capabilities. It may be noted that the processes of FIG. 7 may be preceded by the steps shown in FIG. 5A, wherein the UE is provided with a first capability ID CapID1.

In some embodiments, the UE capability IDs are assigned in the AMF. When the network 10 decides that a new capability ID shall be used, without changing the capability associated with the UE, the AMF reassigns the ID, signals the new capability ID which replaces an old capability ID to the access network, which may signal the new capability ID to the UE. This may be accomplished in accordance with the following:

The network node 110A detects an ID change trigger 71. This may correspond to step 606 of FIG. 6A. The change trigger may indicate a change of capability ID, such as from a current first capability ID CapID1 to a second capability ID CapID2. Moreover, the first and the second capability IDs identify the same set of UE capabilities which are supported by the access network 120 or an access network group 120A.

In some embodiments, detecting said ID change trigger comprises receiving 723 an ID configuration message 711 indicating an alternate identification of said set of UE capabilities, including said second capability ID CapID2. The configuration message 711 may be received by transmission 722 from the central node 115 connected to a global database for UE capabilities, or by transmission 721 from a further network node 110B handling mobility for another access network group 120B, such as at handover of the UE from the access network group 120B to access network group 120A.

The network node transmits 724 a message 712 to the access network 120, including an identification of CapID2.

In some embodiments, an access node 120A of the access network 120 may inform the UE in an RRC message 726, and receive an acknowledgement 731 back, wherein the UE confirms change of its capability ID. Alternatively, the signaling to the UE is handled over NAS 725, wherein the UE conveys 728 the new capability ID CapID2 for receipt 729 in the access network 120 when acknowledged by the UE.

The access network 120 may further transmit an acknowledgment 732 which confirms that the capability ID has been changed, for receipt 730 in the network node 110A, such as the AMF. The network node 110A may optionally further transmit an acknowledgment 733 to the central network node 115 holding the global database 116.

Associated with the described method and network node 110A, various solutions may further be configured in the UE, configured to communicate with the wireless network 10, wherein the UE comprises logic 210 configured to control the UE to:

transmit 53, to the wireless network, capability information for the UE;

receive 55, from the wireless network, a first capability ID CapID1 as an identification of a set of UE capabilities of said capability information;

receive 727, from a network node, a second capability ID CapID2 identifying set of UE capabilities;

change 73 identification of said set of UE capabilities from the first capability ID to the second capability ID, in the UE.

The logic may further be configured to control the UE to transmit 728, to the network node, a message 731 acknowledging that the second capability ID has replaced the first capability ID in the UE.

The second capability ID may be received from an access network, connected to the network node, in a Radio Resource Control, RRC, message 726, or as a Non-Access Stratum, NAS, message 725.

A benefit of the proposed solutions for changing capability ID is that there is no need for the UE to change state during the procedure, as the capabilities are unchanged. The illustrated signaling will be handled in idle mode, when connecting to the network 10. However, if there is any reason for the UE to signal/request the capability ID when the UE is in connected mode, the UE would not need to enter idle mode before the capability ID applies. The proposed methods therefore add little change to legacy behavior of the UE.

FIG. 8 schematically illustrates a database 80 configured for storing UE capability information. The database 80 may correspond to local databases 113A, 113B or to the global database 116. In the database 80, a UE capability ID CapID may be assigned with an indicator or value Val1. For that CapID, associated capability data for the associated UE capabilities are identified, marked as Val2 in the drawing. Moreover, a Type marked by Val3 may indicate whether CapID is manufacturer specific or PLMN specific.

The proposed solutions provide several benefits. Generally, the proposed solutions serve to minimize the amount of data for UE capabilities that has to be transmitted between various nodes in a network 10 of a wireless communication system, and latency associated with such data transmission. The proposed solutions overcome deficiencies associated with various aspects of existing 3GPP specification, of which some are exemplified below

ASPECT 1

If a network operator replaces a manufacturer assigned capability ID with PLMN assigned capability ID then the PLMN will update the capability ID to a PLMN assigned capability ID. However, according to the current procedure as specified, the PLMN needs to keep the same UE capabilities. A UE may support more capabilities than supported in the PLMN so unsupported UE capabilities could be removed in the capability set that corresponds to the PLMN assigned capability set. This will reduce the size of signaling of unsupported capabilities within the PLMN.

The proposals outlined herein which target this aspect involve allowing the network 10 to filter the Manufacturer Assigned capability set to only obtain a subset of capabilities that is used in that PLMN, or part of that PLMN, and optionally to use a PLMN assigned capability ID to that subset. In various embodiments, this subset is a subset of the UE radio capabilities which match the supported functionality in the PLMN.

ASPECT 2

A PLMN Assigned capability ID corresponds to a capability set that is valid to the whole PLMN, but all the PLMN's base stations may not support all capabilities. The proposals outlined herein which target this problem involve allowing an access node to only retrieve the relevant part of the UE capabilities that is valid for that access node. For example, an PLMN Assigned capability ID may correspond to capabilities for 3G, 4G and 5G but a particular access node that only supports 4G should be able to retrieve only the capabilities that is valid for that access node.

Therefore, it is proposed that when an access node request the capabilities that corresponds to a specific capability ID then the access node should also be able to include an access type filter.

ASPECT 3

When a UE register to the PLMN without an existing capability ID, then after the UE has uploaded the UE capabilities the AMF needs to send the capabilities to a network node handling a database, such as the UCMF, which may use some analytics of the capabilities and then either use an existing capability ID or assign a new one. The new or already existing capability ID will then be returned to the AMF and then sent to the UE during registration. The PLMN specific analytics is proprietary and not standardized, but an PLMN may for example in UCMF assign same UE capability ID for multiple devices that uses the same capability set but the order of the capabilities sent from the device may not be the same. All this needs to be done while the UE is waiting for the registration to be completed.

The proposals outlined herein which target this aspect involve allowing the serving AMF to do a quick local assignment of an PLMN assigned capability ID for a device without capability ID and use that directly for the UE. After that, the serving AMF should update UCMF with the local assigned capability ID and corresponding capability set and then UCMF will use existing mechanism to create or find existing capability ID and store the local assigned capability ID as an alias to that. When a UE uses a locally assigned capability ID in the registration, then the AMF will request the correct capability ID from the UCMF and update the capability ID in the UE so the local assigned capability ID is not used anymore. The AMF assigned (local) capability ID's must be unique within UCMF, for example the capability ID may in addition contain AMF ID or AMF set ID for local assigned capability ID's.

Various aspects and embodiments encompassing the solutions described herein are outlined in the appended claims.

The invention claimed is:

1. A method in a wireless network for handling mobility of a user equipment (UE) by providing for transfer of capability information of the UE across one or more peer core network nodes of a core network of the wireless network, wherein the wireless network includes the core network and an access network for communication with the UE, wherein the core network includes a global network node comprising a global capability database storing user equipment (UE) capabilities, wherein each of the one or more peer core network nodes of the core network is in operative communication with the global network node of the core network, wherein the access network includes a plurality of wireless access network nodes each being configured for wireless communication with the UE, the method comprising:

obtaining by the global network node capability information for the UE, wherein the obtained capability information comprises a subset of a complete set of UE capabilities supported by the UE in the wireless network, the subset being obtained by filtering the complete set of UE capabilities supported by the UE with supported capabilities of one or more of the plurality of wireless access nodes of the access network;

storing in one or more of the global capability database or in databases of the one or more peer core network nodes a first capability ID as an identification of a set of UE supported capabilities from the obtained capability information for the UE;

detecting by a first peer core network node of the one or more peer core network nodes of the core network an ID change trigger indicating a second capability ID based on the UE registering with a first wireless access network node of the plurality of wireless access network nodes, the first wireless access network node being in operative communication with the first peer core network node, the second capability ID identifying a set of UE capabilities supported by the first wireless access network node, wherein the detecting the ID change trigger comprises receiving from the global network node and/or from one or more peer core network nodes other than the first peer core network node an ID configuration message that indicates the first capability ID as an alternate identification of the set of UE capabilities supported by the first wireless access network node; and changing by the first peer core network node, responsive to the detecting the ID change trigger, identification in the first peer core network node of the set of UE supported capabilities from the second capability ID indicated based on the UE registering with the first wireless access network node to the first capability ID.

2. The method of claim 1, wherein the core network node is connected to support an access network group of the wireless access network, wherein the first capability ID is associated with the access network group.

3. The method of claim 2, wherein the second capability ID is associated with the entire wireless access network.

4. The method of claim 2, wherein the core network node comprises a network management function connected to or including a local database.

5. The method of claim 4, wherein the network management function comprises an Access and Mobility Management Function (AMF) or an AMF set.

6. The method of claim 1, wherein:

the core network node is connected to support a wireless access network group of an access network, wherein the first capability ID is associated with said wireless access network group; and the ID configuration message is received from the global network node, supporting a further access network group of the wireless network.

7. The method of claim 1, further comprising transmitting, to the UE, a further ID configuration message comprising said second capability ID.

8. The method of claim 7, further comprising receiving an acknowledgement message from the UE, acknowledging that the second capability ID has replaced the first capability ID in the UE.

9. The method of claim 7, further comprising transmitting the second capability ID to the access network for communication to the UE in a Radio Resource Control (RRC) message or as a Non-Access Stratum (NAS) message.

10. The method of claim 9, wherein one or more of the RRC message and/or the NAS message is transmitted without requiring the UE to change connectivity mode.

11. The method of claim 1, wherein the obtaining the capability information for the UE comprises filtering the complete set of UE capabilities supported by the UE in the wireless network with the supported capabilities of the at least one wireless access node.

12. The method of claim 1, wherein the receiving the ID configuration message comprises receiving the ID configuration message from the global network node operating the global capability database of the wireless network.

13. The method of claim 1, wherein:
the obtaining the capability information for the UE comprises storing the capability information for the UE; and
the changing the identification in the core network node of the set of UE supported capabilities from the first capability ID to the second capability ID comprises changing a mapping between the stored capability information for the UE and an identification of the stored capability information for the UE from the first capability ID to the second capability ID.

14. A first peer core network node operable in a core network that includes a global network node comprising a global database storing user equipment (UE) capabilities and one or more peer core network nodes of the core network, and a plurality of wireless access nodes providing a wireless access network, configured to handle mobility of a UE operating in the wireless access network, the first peer network node comprising:
logic configured to control the network node to:
obtain capability information for the UE, wherein the obtained capability information for the UE comprises a subset of a complete set of UE capabilities supported by the UE in the wireless network the subset being obtained by filtering the complete set of UE capabilities supported by the UE with supported capabilities of one or more of the plurality of wireless access nodes of the access network;
store in one or more of the global capability database or in databases of the one or more peer core network nodes a first capability ID as an identification of a set of UE supported capabilities of said the obtained capability information for the UE;
detect by a first peer core network node of the one or more peer core network nodes of the core network the core network node an ID change trigger indicating a second capability ID, based on an ID configuration message received from the global network node, wherein the ID configuration message indicates the first capability ID as an alternative identification to the set of UE capabilities supported by the first wireless access network node; and
change by the first peer core network node, responsive to said the detected ID change trigger, identification in the first peer core network node of the set of UE supported capabilities from the second capability ID indicated based on the UE registering with the first wireless access network node to the first capability ID.

15. A method of operating a first peer core network node in a core network of a wireless network for handling mobility of a user equipment (UE) that is in operative communication with a wireless access node of the wireless network, the core network including one or more peer core network nodes and a global network node, wherein each of the one or more peer core network nodes of the core network is in operative communication with the global network node of the core network, wherein the access network includes a plurality of wireless access network nodes each being configured for wireless communication with the UE, the method comprising:
obtaining by the first peer core network node from the global network node and/or from a further peer core network node of the core network a first capability identification (ID) identifying a first set of UE capabilities associated with the UE;
transmitting by the first peer core network node, to a central global database of a global network node of the core network in operative communication with the wireless network node, a request message based on the first capability ID and filter information associated with supported capabilities of the access node to obtain UE capabilities for the UE;
receiving by the first peer core network node, from the central global database, a filtered set of capabilities based on the first capability ID and the filter information;
transmitting by the first peer core network node the filtered set of capabilities to the wireless access node;
detecting by the first peer core network node an ID change trigger indicating a second capability ID based on the UE registering with a first wireless access network node of the plurality of wireless access network nodes, the first wireless access network node being in operative communicate on with the first peer core network node, the second capability ID identifying a set of UE capabilities supported by the first wireless access network node, wherein the detecting the ID change trigger comprises receiving from the global network node and/or from one or more peer core network nodes other than the first peer core network node an ID configuration message that indicates the first capability ID as an alternate identification of the set of UE capabilities supported by the first wireless access network node; and
changing by the first peer core network node, responsive to the detecting the ID change trigger, identification in the first peer core network node of the set of UE supported capabilities from the second capability ID indicated based on the UE registering with the first wireless access network node to the first capability ID.

* * * * *